March 2, 1943.　　　A. J. RADIN　　　2,312,930
ORTHOPTIC APPARATUS
Filed May 29, 1942　　　2 Sheets-Sheet 1

INVENTOR.
ALEXANDER J. RADIN
BY
Simon Broder

Patented Mar. 2, 1943

2,312,930

UNITED STATES PATENT OFFICE 2,312,930

ORTHOPTIC APPARATUS

Alexander J. Radin, Brooklyn, N. Y.

Application May 29, 1942, Serial No. 445,055

10 Claims. (Cl. 128—76.5)

My previous Patent No. 2,252,408, issued August 12, 1941, discloses an orthoptic device for exercising the orbital ocular muscles. The optical system for the left eye comprises an eyepiece and an objective which rotate continuously but in opposite directions. The optical system for the right eye comprises a continuously rotating objective which rotates in the same direction as the left eyepiece, and an harmonically rotating eyepiece. When the machine is operating, the eye muscles will periodically tension and relax in an endeavor to fuse or converge the lines of sight so that both eyes will see a single image. The variation in direction of the two lines of sight during the operation of the machine will depend on two factors:

1. The patient; that is, on the shape of the eyeball, the shape of the lens of the eye, and the ability to fuse; and 2. The prismatic effect of the optical systems. The speed of variation of the lines of sight will depend, of course, on the speed of movement of the lenses. If one eye is relatively weaker than the other, it will be necessary to correct substantially for myopia or hypermetropia or strabismus or whatever else the refractive ailment is, so that the patient can have binocular vision during operation of the device.

I have found that some patients are unable to fuse for more than a small arc of rotation of the lenses. For example, a patient may theoretically be able to fuse for a distance of 15 degrees on either side of a vertical center line where the images coincide, or a total of thirty degrees. For the remainder of the cycle, 330 degrees, the lines of sight will not converge emmetropically and the patient will see double. Due to the time lag and persistence of vision, the images will not fuse until a considerable time after the fusion area has been entered by the lenses, so that actually the duration of fusion may be 10 degrees as the two images approach coincidence and 15 degrees as they recede, a total of 25 degrees.

Some persons have so little muscle control that after fusion is broken they actually follow the movements of the two separate images throughout the cycle of 360 degrees, except for the instant when the images coincide. In such cases it is obvious that the eyes will obtain little benefit from the exercise.

My present invention has for its primary object the provision of means for assuring fusion for any and every patient at all times during the operation of the machine. I obtain this result by alternately rotating the optical systems for any desired portion of a cycle, during which fusion is retained, and increasing the extent of movement as the patient's muscles improve.

Other objects will appear as the invention is more particularly described.

Reference is had to the accompanying drawings, forming part of this application, wherein.

Figure 1:
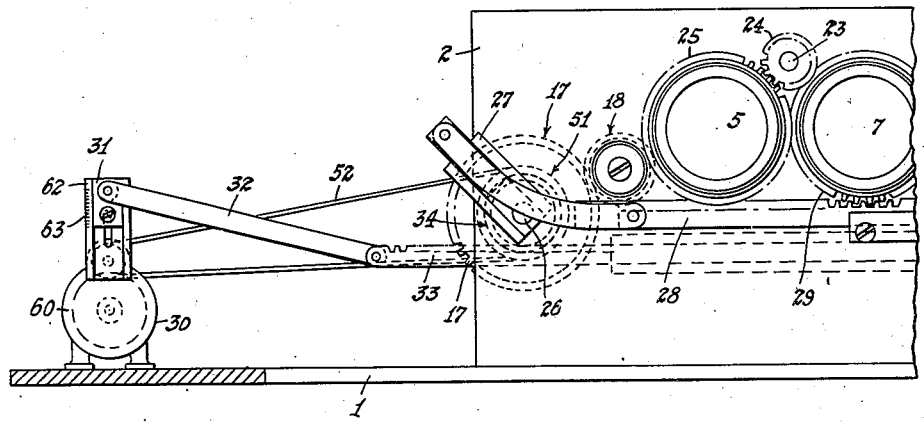
Fig. 1 is a front elevation of a preferred form of my invention.

On the horizontal base 1 is fixed the vertical support 2 which holds the lenses and related equipment. The left eyepiece 5 is associated with its objective 6, and the right eyepiece 7 with its objective 8. If desired, only one eyepiece and one objective may be used, or two or more of each, or only two eyepieces or two objectives, as conditions may require.

Motive energy is obtained from the motor 30 by means of the crank 31, the connecting rod 32, and the rack 33. This rack 33 meshes with the pinion 34 which is freely rotatable on the shaft 26. The gear 17, fixed on the shaft 26, drives the gears 18, 19, and 20. The members 19 and 20 impart rotary movement to the left objective 6 and the right objective 8, respectively. The gear 20 also meshes with the pinion 22 fixed on the rear of the shaft 23. The shaft 23 is unitary, and on its front end has fixed a spur 24 which meshes with the gear 25. The latter drives the left eyepiece 5.

At the front end of the shaft 26 is rigidly attached a radial arm 27. A link is pivoted at one end to the arm 27 and at the other end to a horizontal rack 28. The rack 28 meshes with the gear 29 which drives the right eyepiece 7. Consequently, the right eyepiece 7 will be given a harmonic rotation of 180 degrees back and forth for each rotation of the gear 17 and the lenses 5, 6, and 8. The arm 27 is adjustable radially of the shaft 26, thereby controlling the rate of harmonic rotation.

A clutch 41 is movable longitudinally of the shaft 26, to which it is keyed to rotate therewith. One side of the clutch has teeth with which to engage complementary teeth or grooves in the side of the pinion 34, so that engagement therewith will transmit energy from the motor 30 through the pinion 34 and the clutch 41 to the shaft 26. The other side of the clutch 41 also has teeth with which to engage complementary teeth or grooves in the adjacent side of the sprocket wheel 51, which is freely rotatable on the shaft 26. The sprocket wheel 51 is given continuous rotary motion by the motor 30 by means of the sprocket chain 52 and the sprocket spur 53 on the shaft of the motor 30. Thus, the gear 34 and the sprocket wheel 51 are always in motion when the motor operates, and the shaft 26 turns whenever the clutch 41 engages either the gear 34 or the sprocket wheel 51.

Figure 2:
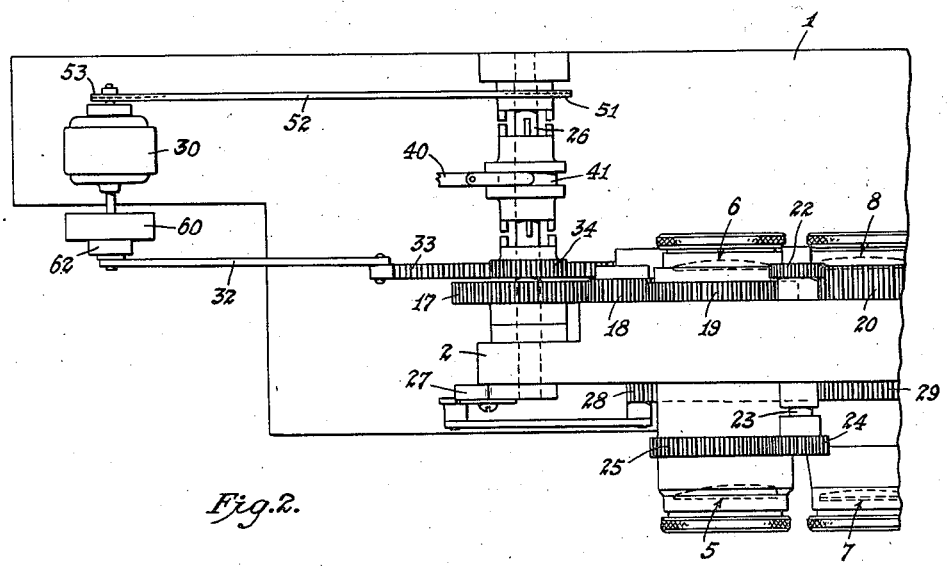
Fig. 2 is a top view, partially in section.

When the clutch handle 40 is actuated to move the clutch 41 forward (toward the bottom of Fig. 2), the clutch will engage the gear 34, and consequently the lenses 5, 6, and 8 will be rotated harmonically, while the right eyepiece 7 will be given a harmonic movement displaced in phase with respect to the harmonic movement imparted to its associated objective 8. When the clutch handle 40 is moved to engage the clutch 41 with the sprocket wheel 51, the lenses 5, 6, and 8 will rotate continuously and the lens 7 harmonically. When the clutch is in neutral, the shaft 26 will not turn and the lenses will be stationary.

The front end of the shaft of the motor 30 has fixed to it a disc 60 and a crank arm 62. The crank 31 is fastened by a set screw to the crank arm 62. Thus, rotation of the motor shaft will rotate the disc 60, revolve the crank arm 62 and the crank 31, and reciprocate the rack 33 by means of the connecting rod 32. The throw of the crank 31 may be varied by adjusting the position of the crank 31 in the crank arm 62. The amount of variation may be indicated by markings 63 or other indicia on the crank arm 62.

When the clutch 41 is pulled forward, it will engage with the gear 34, which is driven by the reciprocating rack 33. The clutch 41 and the keyed shaft 26 will then rotate back and forth, the degree depending on the dimensions of the gear 34, the rack 33, the connecting arm 32, the crank 31, the crank arm 62, and the disc 60. All these dimensions are fixed except for the throw of the crank 31, which, as described, can be varied. Therefore, the degree of rotation of the gear 17 and the connected lens gears will depend on the adjustment of the crank 31 in the crank arm 62. The harmonic rotation of the right eyepiece 7 is always a mathematic function of the movement of the shaft 26.

The speed of movement of the gears and lenses will be controlled by utilizing a rheostat to change the speed of the motor.

With my improved apparatus, I can use a single set of lenses for a wide range of ocular abnormalities, it being merely necessary to have such lenses that fusion can be attained at some one position of the lenses. The machine is started with the clutch 41 pulled forward so that the gear 34 will be engaged to give harmonic rotation to all the lenses. The extent of oscillation may be, for example, five degrees each side of center, if the patient can hold fusion for at least that extent. As the lenses go back and forth, the muscles will tense and relax rhythmically, leading to the benefits I have described. The exercise is continued for the desired time, during which fusion is retained constantly. Subsequently, the crank 31 is moved outwardly in the crank arm 62 to obtain a greater oscillation of the lenses, and the patient will receive a slightly greater degree of exercise. I have found that ultimately most patients can be advanced until the oscillatory rotation reaches almost 180 degrees in each direction; after this, the clutch 41 is pushed to engage the sprocket wheel 51 to continuously rotate the lenses 5, 6, and 8 and thereby give a greater degree of exercise. In addition, or in lieu thereof, the lenses may be replaced to give a different refractive result.

Figure 3:
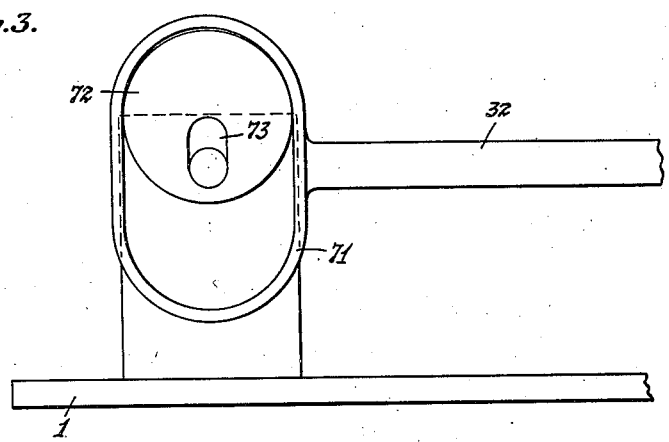
Fig. 3 is a front elevation of another form of mechanism for converting continuous rotary movement into discontinuous movement.

In Fig. 3 I show another way of obtaining variable reciprocatory motion from the motor 30. An eccentric strap 71 fixed to the end of the connecting rod 32 is actuated by the eccentric 72. The eccentric 72 is slotted at 73 to permit adjustment of the eccentric throw about the motor shaft. This slot 73, too, may have indicia to guage the degree of oscillation of the lenses.

Figure 4:
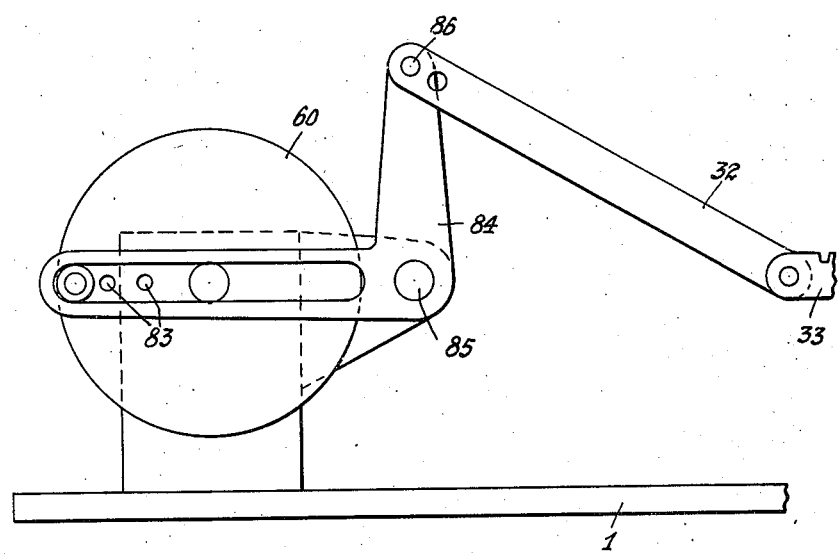
Fig. 4 is a front elevation of another form.

Fig. 4 illustrates still another modification. The disc 60 fixed to the motor shaft has several openings 83 to which one arm of a bell crank 84 may be fastened by means of a set screw. The crank 84 is pivoted at 85, and the other end of the crank 84 is pivoted at 86 to the connecting arm 32. The pivot 86 may be varied, and so may the pivot 85, to permit greater variation.

Having described my invention, what I now claim as new and desire to protect by Letters Patent is:

1. In a device of the character described, an eyepiece and objective for each eye, means for turning the lenses about their optical axes to vary the directions of the lines of sight, and means for controlling the turning means so that the lenses are turned automatically only a predetermined amount.

2. In a device of the character described, an optical system for each eye, a motor, means connected to the motor for harmonically rotating one of the optical systems, and means connected to the motor for optionally turning the other optical system either harmonically or continuously.

3. In a device of the character described, an optical system for each eye, means for turning each system to vary the direction of the lines of sight, and means for automatically reversing the turning movement when a predetermined point has been reached.

4. In a device of the character described, a set of lenses, means for imparting to one of said lenses continuous motion and to another lens discontinuous motion and means for optionolly changing the motion of the continuously driven lens to discontinuous, wherein the last-claimed means also changes the motion of the discontinuously driven lens to another discontinuous motion which is a function of the motion of the first-mentioned lens.

5. In a device of the character described, a lens for one eye, a lens for the other eye, means for imparting to one lens either continuous or harmonic motion, and means for imparting to the other lens at the same time either harmonic or double harmonic motion.

6. In a device of the character described, an aligned eyepiece and objective for each eye, means for imparting rotation to one eyepiece in an opposite direction to that of its objective and in the same direction as the other objective and exactly in phase with both, means for imparting to the other objective a motion which is always harmonic in relation to the other three lenses, and means for making the motion of the other three lenses either harmonic or continuous.

7. The combination set forth in claim 6, wherein the last-claimed means comprises a motor, a disc fixed on the motor shaft, a crank arm fixed to the disc, an adjustable crank slidable in the crank arm, a connecting rod pivoted at one end to the crank, and a mechanism for transmitting the motion of the other end of the connecting rod to the lenses.

8. The combination set forth in claim 6, wherein the last-claimed means comprises a motor, a disc fixed on the motor shaft, a crank arm fixed to the disc, an adjustable crank slidably fastened to the crank arm, a connecting rod pivoted at one end to the crank, a sprocket wheel driven continuously by the motor shaft, and means for optionally transmitting the continuous motion of the sprocket wheel or the discontinuous motion of the connecting rod to the related three lenses.

9. In a device of the character described, a lens, an objective, and means for imparting harmonic oscillations to the said lens and to the said objective, said harmonic oscillations being displaced in phase relative to each other.

10. In a device of the character described, an eyepiece and objective for each eye, a motor, means connected to the motor for harmonically rotating both objectives and one eyepiece in phase with each other and for imparting a harmonic movement to the second eyepiece, said last-named harmonic movement being displaced in phase relative to the harmonic rotations imparted to both of the said objectives and to the said one eyepiece.

ALEXANDER J. RADIN.